(12) United States Patent
Yano et al.

(10) Patent No.: US 12,091,208 B2
(45) Date of Patent: Sep. 17, 2024

(54) SYNTHETIC RESIN-MADE CONTAINER, AND METHOD OF MANUFACTURING SYNTHETIC RESIN-MADE CONTAINER

(71) Applicant: YOSHINO KOGYOSHO CO., LTD., Tokyo (JP)

(72) Inventors: Naoyuki Yano, Tokyo (JP); Kazunari Niida, Tokyo (JP); Hironori Tateno, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 406 days.

(21) Appl. No.: 17/296,475

(22) PCT Filed: Oct. 7, 2019

(86) PCT No.: PCT/JP2019/039533
§ 371 (c)(1),
(2) Date: May 24, 2021

(87) PCT Pub. No.: WO2020/110468
PCT Pub. Date: Jun. 4, 2020

(65) Prior Publication Data
US 2022/0024105 A1    Jan. 27, 2022

(30) Foreign Application Priority Data

Nov. 30, 2018  (JP) ................................. 2018-225993

(51) Int. Cl.
*B65D 1/02* (2006.01)
*B29C 49/00* (2006.01)
(Continued)

(52) U.S. Cl.
CPC ........ *B65D 1/0215* (2013.01); *B29C 49/0005* (2013.01); *B29C 49/22* (2013.01);
(Continued)

(58) Field of Classification Search
CPC ...... B65D 1/0215; B65D 23/02; B65D 25/14; B65D 79/005; B65D 79/008; B65D 79/0081; B65D 79/0084; B29C 2949/074
(Continued)

(56) References Cited

U.S. PATENT DOCUMENTS 3,468,443 A * 9/1969 Marcus ................ B65D 1/0284
220/606
4,620,639 A * 11/1986 Yoshino ............... B65D 1/0276
215/373
(Continued)

FOREIGN PATENT DOCUMENTS

JP          10180853 A  *  7/1998
JP       2007-290772 A    11/2007
(Continued)

OTHER PUBLICATIONS

May 30, 2022 Office Action issued in Chinese Patent Application No. 201980077385.2.
(Continued)

*Primary Examiner* — Michael C Romanowski
(74) *Attorney, Agent, or Firm* — Oliff PLC

(57) ABSTRACT

A synthetic resin-made container is a synthetic resin-made container that has an outer layer body and an inner layer body separably laminated on an inner surface of the outer layer body and is formed by stretch blow molding, and includes: a tubular mouth portion; a barrel portion connected to and located below the mouth portion; and a bottom portion closing a lower end of the barrel portion, wherein the outer layer body contains polyethylene terephthalate, the inner layer body contains polyethylene terephthalate, a laminate containing polyethylene terephthalate, or a blend containing polyethylene terephthalate, and has a vapor-deposited film having a gas barrier property on an inner surface thereof, and a rib that prevents the inner layer body from
(Continued)

peeling away from the outer layer body when forming the vapor-deposited film is formed in at least one of a lower part of the barrel portion and the bottom portion.

3 Claims, 7 Drawing Sheets

(51) Int. Cl.
 *B29C 49/22* (2006.01)
 *B65D 23/02* (2006.01)
 *B29K 67/00* (2006.01)

(52) U.S. Cl.
 CPC ........ *B65D 23/02* (2013.01); *B29C 2949/074* (2022.05); *B29C 2949/08* (2022.05); *B29K 2067/003* (2013.01); *B65D 2501/0027* (2013.01)

(58) Field of Classification Search
 USPC .............................................. 428/34.1–36.92
 See application file for complete search history.

(56) References Cited

U.S. PATENT DOCUMENTS

| | | | | |
|---|---|---|---|---|
| 5,301,838 A * | 4/1994 | Schmidt | ............. | B65D 83/0055 222/105 |
| 5,344,045 A * | 9/1994 | Richter | ............... | B67D 1/0462 215/381 |
| 5,921,416 A * | 7/1999 | Uehara | ................ | B65D 1/0215 264/516 |
| 5,952,066 A | 9/1999 | Schmidt et al. | | |
| 5,968,616 A * | 10/1999 | Kakemura | ........... | B65D 1/0215 428/903.3 |
| 6,266,943 B1 * | 7/2001 | Nomoto | ............. | B05B 11/1047 156/244.14 |
| 7,258,244 B2 * | 8/2007 | Ungrady | ............ | B65D 79/0084 215/381 |
| 8,567,624 B2 * | 10/2013 | Coley, Jr. | ............. | B65D 23/102 215/384 |
| 8,851,311 B2 * | 10/2014 | Castillo Higareda | ....................... | B65D 23/102 215/379 |
| 9,714,109 B2 * | 7/2017 | Kira | ..................... | B65D 1/0223 |
| 2001/0037992 A1 * | 11/2001 | Tanabe | ............... | B65D 79/0084 215/382 |
| 2001/0054597 A1 * | 12/2001 | Ozawa | ............... | B65D 79/0084 215/381 |
| 2004/0060889 A1 * | 4/2004 | Yoneyama | ........... | B65D 1/0215 215/12.1 |
| 2004/0060896 A1 * | 4/2004 | Itokawa | ............... | B65D 1/0284 220/606 |
| 2005/0103802 A1 * | 5/2005 | Alberg | ................. | B67D 7/0261 222/105 |
| 2007/0007234 A1 * | 1/2007 | Tanaka | ............... | B65D 23/0878 215/381 |
| 2007/0178265 A1 * | 8/2007 | Takada | ............... | B65D 23/0821 428/35.7 |
| 2007/0187354 A1 * | 8/2007 | Sasaki | ................ | B65D 79/0084 215/384 |
| 2011/0233166 A1 * | 9/2011 | Hiromichi | ............ | B65D 1/0261 215/370 |
| 2013/0026128 A1 * | 1/2013 | Beck | ........................ | B65D 1/44 215/382 |
| 2013/0180943 A1 * | 7/2013 | Kurihara | ............ | B65D 79/0081 215/374 |
| 2013/0323423 A1 * | 12/2013 | Nakaya | ................. | C23C 16/045 427/255.28 |
| 2014/0166609 A1 * | 6/2014 | Yourist | .............. | B65D 79/0084 215/383 |
| 2014/0202975 A1 * | 7/2014 | Tom | ..................... | B67D 1/0462 264/516 |
| 2015/0041426 A1 * | 2/2015 | Oguchi | ................ | B65D 1/0276 215/382 |
| 2015/0298890 A1 * | 10/2015 | Miyairi | .............. | B65D 83/0061 215/12.1 |
| 2018/0370671 A1 * | 12/2018 | Kitora | ................. | B65D 1/0246 |

FOREIGN PATENT DOCUMENTS

| | | | | |
|---|---|---|---|---|
| JP | 2012-116516 A | 6/2012 | | |
| JP | 2014-511292 A | 5/2014 | | |
| JP | 2014083749 A | * 5/2014 | ............. | B65D 1/00 |
| JP | 2016-055895 A | 4/2016 | | |
| JP | 2017148963 A | * 8/2017 | ............. | B65D 1/02 |
| JP | 2018-043790 A | 3/2018 | | |
| WO | 98/13265 A2 | 4/1998 | | |
| WO | 2017/169036 A1 | 10/2017 | | |

OTHER PUBLICATIONS

Jul. 19, 2022 extended Search Report issued in European Patent Application No. 19889360.4.
Sep. 6, 2022 Office Action issued in Canadian Patent Application No. 3,120,928.
Feb. 28, 2023 Office Action Issued in Korean Patent Application No. 10-2021-7015683.
Apr. 17, 2023 Office Action Issued in European Patent Application No. 19 889 360.4.
Dec. 24, 2019 International Search Report issued in International Patent Application No. PCT/JP2019/039533.

* cited by examiner

DETAIL OF PART A

SYNTHETIC RESIN-MADE CONTAINER, AND METHOD OF MANUFACTURING SYNTHETIC RESIN-MADE CONTAINER

CROSS REFERENCE TO RELATED APPLICATION

This application claims priority to and the benefit of Japanese Patent Application No. 2018-225993 filed on Nov. 30, 2018, the entire disclosure of which is incorporated herein by reference.

TECHNICAL FIELD

The present disclosure relates to a synthetic resin-made container having an outer layer body and an inner layer body separably laminated on the inner surface of the outer layer body, and a method of manufacturing a synthetic resin-made container.

BACKGROUND

Delamination containers are conventionally known as containers for containing food seasonings such as soy sauce, beverages, cosmetics such as skin lotions, and toiletries such as shampoos, hair conditioners, and liquid soaps as content liquids (for example, see JP 2012-116516 A (PTL 1)).

Such a delamination container has a double structure in which an inner layer body having a space for containing a content liquid and capable of volume-reduction deformation is separably laminated on the inner surface of an outer layer body forming an outer shell of the container and including a tubular mouth portion, a barrel portion connected to the mouth portion, and a bottom portion closing the lower end of the barrel portion. The delamination container is used, for example, as a squeeze-type discharge container combined with a discharge cap having a check valve, or a pump-type container combined with a pump. In this case, the content liquid can be discharged to the outside by squeezing (compressing) the barrel portion of the outer layer body or operating the pump. After discharging the content liquid, by introducing outside air between the inner layer body and the outer layer body from an outside air introduction port formed in the outer layer body, the outer layer body can be restored to the original shape while the inner layer body remains volume-reduction deformed. With such a delamination container, the content liquid contained in the inner layer body can be discharged without replacing it with outside air, so that contact of the content liquid contained in the inner layer body with outside air can be reduced and degradation or degeneration of the content liquid can be suppressed.

For example, the delamination container can be manufactured by stretch blow molding a preform including an outer body made of polyethylene terephthalate (PET) and an inner body located on the radially inner side of the outer body and equally made of polyethylene terephthalate (PET).

CITATION LIST

Patent Literature

PTL 1: JP 2012-116516 A

SUMMARY

Technical Problem

In the foregoing delamination container manufactured by stretch blow molding the double preform made of polyethylene terephthalate (PET), the barrier property against gas such as oxygen may be insufficient because the inner layer body is thin. By forming a vapor-deposited film having gas barrier property on the inner surface of the inner layer body, the gas barrier property can be enhanced. However, vacuuming the inside of the inner layer body in order to form the vapor-deposited film tends to cause the inner layer body to peel away from the outer layer body. If the inner layer body peels away from the outer layer body during vapor deposition, the thin inner layer body may deform or melt and become perforated due to plasma heat. This leaves room for improvement.

It could therefore be helpful to provide a synthetic resin-made container and a method of manufacturing a synthetic resin-made container that, when forming a vapor-deposited film on an inner surface of an inner layer body, prevent the inner layer body from peeling away from an outer layer body.

Solution to Problem

A synthetic resin-made container according to the present disclosure is a synthetic resin-made container that has an outer layer body and an inner layer body separably laminated on an inner surface of the outer layer body and is formed by stretch blow molding, the synthetic resin-made container comprising: a tubular mouth portion; a barrel portion connected to and located below the mouth portion; and a bottom portion closing a lower end of the barrel portion, wherein the outer layer body contains polyethylene terephthalate, the inner layer body is made of polyethylene terephthalate, a laminate containing polyethylene terephthalate, or a blend containing polyethylene terephthalate, and has a vapor-deposited film having a gas barrier property on an inner surface thereof, and a rib that prevents the inner layer body from peeling away from the outer layer body when forming the vapor-deposited film is formed in at least one of a lower part of the barrel portion and the bottom portion.

Preferably, in the synthetic resin-made container according to the present disclosure, the rib formed in the lower part of the barrel portion is an annular concave rib extending in a circumferential direction.

Preferably, in the synthetic resin-made container according to the present disclosure, the rib formed in the bottom portion is concave ribs arranged approximately at equal intervals in a circumferential direction.

A method of manufacturing a synthetic resin-made container according to the present disclosure is a method of manufacturing a synthetic resin-made container that has an outer layer body and an inner layer body laminated on an inner surface of the outer layer body, the synthetic resin-made container including: a tubular mouth portion having an outside air introduction port formed through the outer layer body; a barrel portion located below the mouth portion; and a bottom portion closing a lower end of the barrel portion, the method comprising: forming a preform; stretch blow molding the preform to form an outer shape of the synthetic resin-made container; blocking the outside air introduction port from an ambient pressure outside the outer layer body; and forming a vapor-deposited film having a gas barrier property, on an inner surface of the inner layer body.

Preferably, in the method of manufacturing a synthetic resin-made container according to the present disclosure, an annular protrusion projecting radially outward is located below the outside air introduction port, and the blocking includes causing an abutting portion of a tubular seal member to abut the annular protrusion from above.

Preferably, in the method of manufacturing a synthetic resin-made container according to the present disclosure, the annular protrusion is a neck ring for attaching the preform to a mold for blow molding.

Advantageous Effect

It is thus possible to provide a synthetic resin-made container and a method of manufacturing a synthetic resin-made container that, when forming a vapor-deposited film on an inner surface of an inner layer body, prevent the inner layer body from peeling away from an outer layer body.

DETAILED DESCRIPTION

Figure 1A:
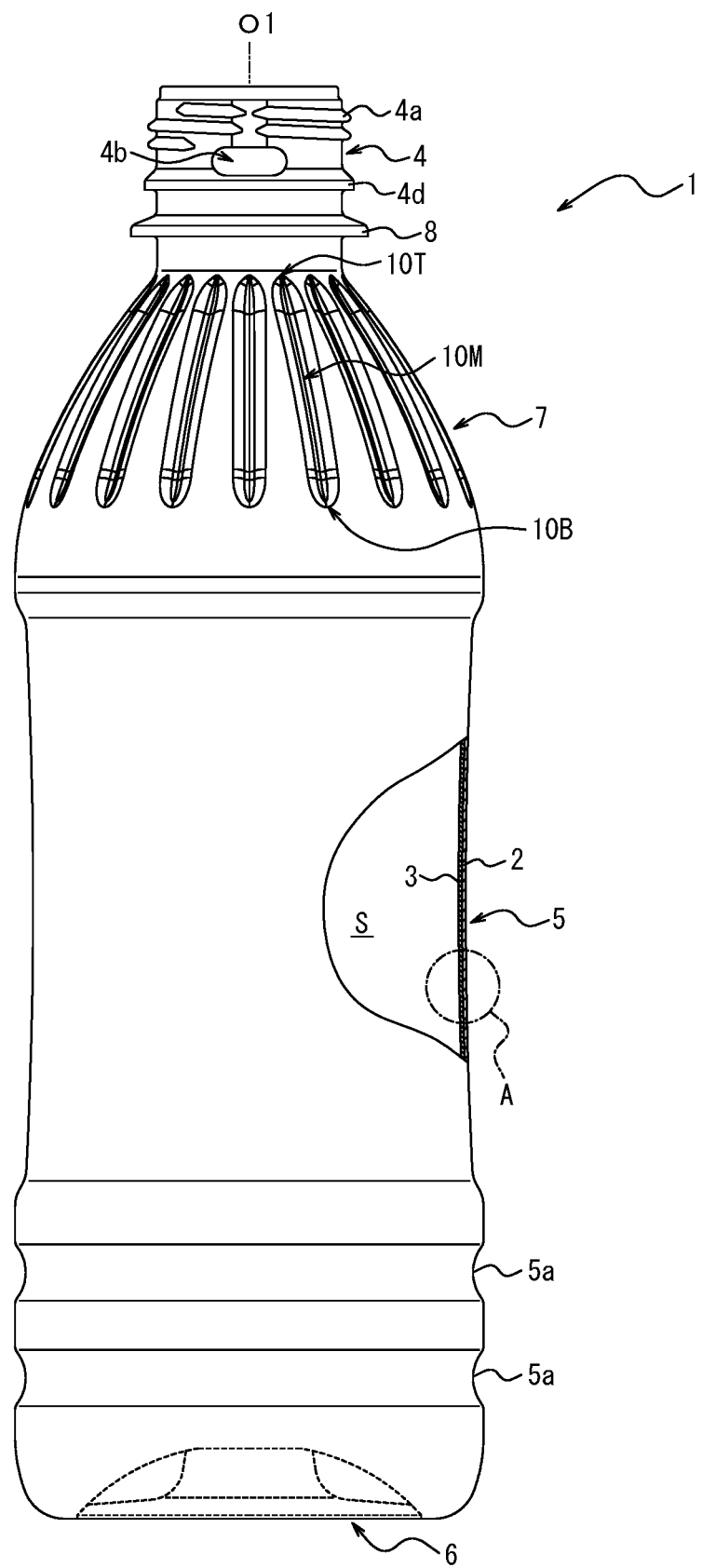
FIG. 1A is a partial front sectional view of a synthetic resin-made container according to one of the disclosed embodiments.

More detailed description will be given below with reference to the drawings.

A synthetic resin-made container 1 according to one of the disclosed embodiments illustrated in FIGS. 1A to 3 is called a delamination container. The synthetic resin-made container 1 has a double structure including an outer layer body 2 and an inner layer body 3. The outer shape of the synthetic resin-made container 1 is a bottle shape including a cylindrical mouth portion 4, a shoulder portion 7 located below the mouth portion 4 and increasing in diameter downward, a cylindrical barrel portion 5 connected to the shoulder portion 7 below the mouth portion 4, and a bottom portion 6 closing the lower end of the barrel portion 5.

In the description, the claims, and the drawings, the term "vertical direction" (upward-downward) refers to an upward-downward direction in a state in which the synthetic resin-made container 1 is in an upright position as illustrated in FIG. 1A. The term "radially outward" refers to a direction toward the outside along a straight line that passes the central axis O1 of the synthetic resin-made container 1 and is perpendicular to the central axis O1 in FIG. 1A. The term "radially inward" refers to a direction toward the central axis O1 along the straight line.

The mouth portion 4 has a male screw 4a. A discharge member such as a discharge cap or a discharge pump can be attached to the mouth portion 4 by screw connection to the male screw 4a. The mouth portion 4 may have an annular protrusion (e.g. a bead 4d in FIG. 1A) instead of or together with the male screw 4a so that a discharge member such as a discharge cap can be attached to the mouth portion 4 by undercut engagement through capping. A lower part of the mouth portion 4 is provided with a neck ring 8 for fixing the below-described preform 11 to a mold for blow molding when molding the synthetic resin-made container 1 by, for example, stretch blow molding.

An example in which the synthetic resin-made container 1 is used as a squeeze-type discharge container will be described below.

The outer layer body 2 forms an outer shell of the synthetic resin-made container 1, and may be made of a synthetic resin material containing polyethylene terephthalate (PET), polypropylene (PP), polyethylene (PE), or the like as a main component. The part of the outer layer body 2 corresponding to the barrel portion 5 is flexible, and can dent when squeezed (compressed) and also return to the original shape from the dented state. In the case where the synthetic resin-made container 1 is used as a pump-type container, the part of the outer layer body 2 corresponding to the barrel portion 5 need not be squeezable.

The inner layer body 3 may be made of a synthetic resin material such as polyethylene terephthalate (PET) or nylon, in a bag shape thinner than the outer layer body 2. The inner layer body 3 is separably laminated on the inner surface of the outer layer body 2. The inside of the inner layer body 3 is a containing portion S connected to the opening of the mouth portion 4. The containing portion S is capable of containing, for example, any of food seasonings such as soy sauce, beverages, cosmetics such as skin lotions, and toiletries such as shampoos, hair conditioners, and liquid soaps as contents. The inner layer body 3 is not limited to a single-layer structure, and may be a laminate (e.g. a three-layer structure of PET/nylon/PET) or a blend (e.g. a blend of PET+nylon). Its vapor-deposited surface preferably has PET as a main component.

Figure 1B:
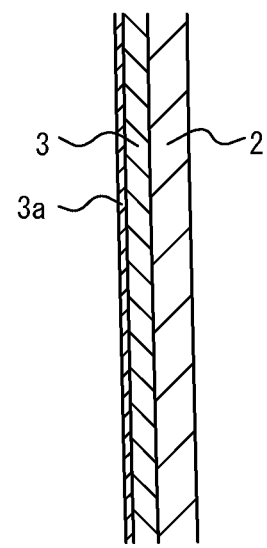
FIG. 1B is a detail view of part A in FIG. 1A.

A vapor-deposited film 3a is formed on the inner surface of the inner layer body 3, as illustrated in FIG. 1B. In this embodiment, the vapor-deposited film 3a is made of silica or diamond-like carbon (DLC). Thus, for example even in the case where the outer layer body 2 and the inner layer body 3 are made of polyethylene terephthalate (PET) and the inner layer body 3 is not thick enough to ensure sufficient gas barrier property, the amount of gas such as oxygen passing through the inner layer body 3 can be reduced because the vapor-deposited film 3a has predetermined gas barrier property. The contents in the inner layer body 3 can therefore be prevented from coming into contact with oxygen or the like and degrading. The material of the vapor-deposited film 3a is not limited to the above, and the vapor-deposited film 3a may be made of any other material having gas barrier property.

The mouth portion 4 of the outer layer body 2 has an outside air introduction port 4b for introducing outside air between the outer layer body 2 and the inner layer body 3, as illustrated in FIG. 1A. The outside air introduction port 4b preferably has a function as a check valve or has a check valve attached thereto so as to introduce outside air between the outer layer body 2 and the inner layer body 3 but prevent air existing between the outer layer body 2 and the inner layer body 3 from flowing outside. The outside air introduction port 4b may not be provided with a check valve or a check valve function. The shape of the outside air introduction port 4b is not limited to a long hole shape illustrated in the drawing, and may be any of other various shapes such as a circular shape. The outside air introduction port 4b may be formed by providing a gap in the part of a flange 14c in FIG. 4.

The synthetic resin-made container 1 having such a structure can form a discharge container when a discharge member such as a discharge cap is attached to the mouth portion 4. In this case, by squeezing (compressing) the part of the outer layer body 2 corresponding to the barrel portion 5, the contents can be discharged to the outside from the discharge member, and, with the discharge of the contents, the inner layer body 3 can separate from the inner surface of the outer layer body 2 and volume-reduction deform. After the squeeze is released, outside air is introduced between the outer layer body 2 and the inner layer body 3 from the outside air introduction port 4b formed in the outer layer body 2, as a result of which the outer layer body 2 can return to the original shape while the inner layer body 3 remains volume-reduction deformed. In this way, the contents contained in the containing portion S can be discharged without replacing the contents with outside air, so that contact of the contents contained in the containing portion S with outside air can be reduced and degradation and degeneration of the contents can be suppressed.

The synthetic resin-made container 1 is formed by stretch blow molding, with a neck ring 18 of the preform 11 (see FIG. 4) corresponding to the neck ring 8 in FIG. 1A being fixed to a mold for blow molding.

The shoulder portion 7 in the synthetic resin-made container 1 has at least one vertical rib 10 extending in the vertical direction, as illustrated in FIG. 1A. As a result of the shoulder portion 7 having the vertical rib 10, when forming the vapor-deposited film 3a on the inner surface of the inner layer body 3 in the manufacturing process of the synthetic resin-made container 1, the inner layer body 3 in the shoulder portion 7 can be prevented from peeling away from the outer layer body 2 even when the inside of the inner layer body 3 is vacuumed. Moreover, after the formation of the vapor-deposited film 3a and before use, a gap is formed between the inner layer body 3 and the outer layer body 2 in the surrounding region of the vertical rib 10 after initial separation treatment of separating the inner layer body 3 from the outer layer body 2 by a method such as blowing air in from the outside air introduction port 4b and restoring the inner layer body 3 to the original shape by injecting air from the upper end opening of the mouth portion 4. By forming such a gap between the inner layer body 3 and the outer layer body 2 in the surrounding region of the vertical rib 10, outside air can be easily introduced between the inner layer body 3 and the outer layer body 2 from the outside air introduction port 4b through the gap during use (i.e. when discharging the contents).

Figure 2:
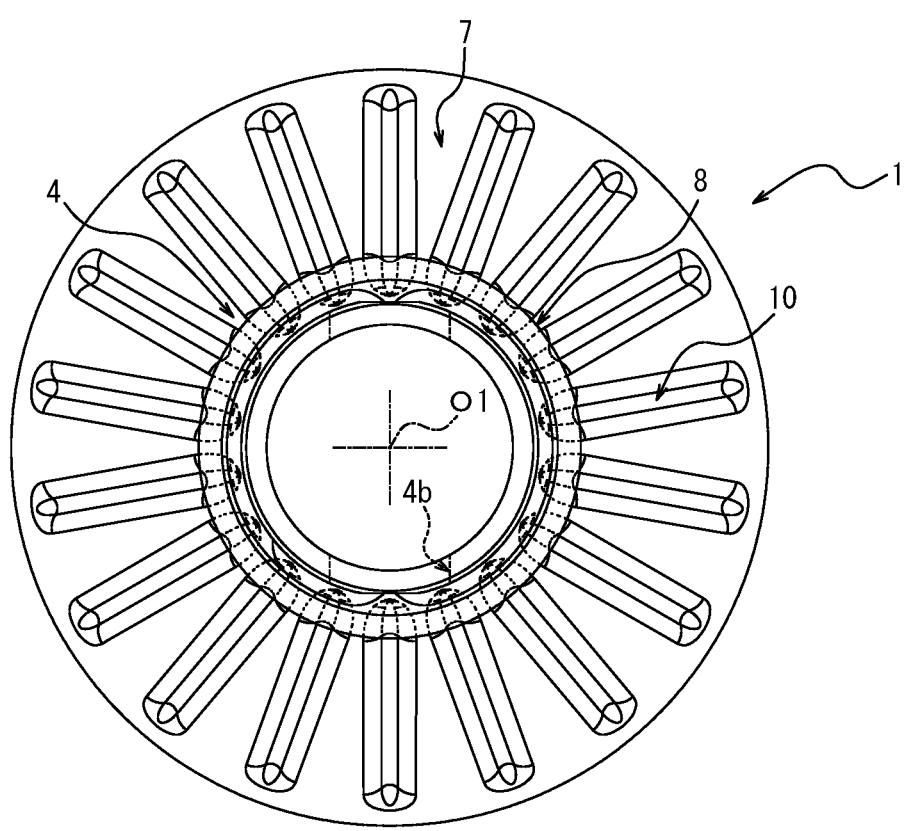
FIG. 2 is a plan view of the synthetic resin-made container according to one of the disclosed embodiments.

In this embodiment, 18 vertical ribs 10 are arranged at equal intervals in the circumferential direction, as illustrated in FIG. 2. The number of vertical ribs 10, the length of each vertical rib 10, and the like may be varied.

In this embodiment, each vertical rib 10 is formed as a concave rib that extends in the vertical direction and is depressed toward the inside of the container. In the part where the vertical rib 10 is formed, the shape of the inner layer body 3 is a concave rib shape corresponding to the shape of the outer layer body 2.

The groove depth of the vertical rib 10 is smaller in the upper end 10T and the lower end 10B than in the central part 10M in the vertical direction. As a result of the groove depth being smaller in the upper end 10T and the lower end 10B, the inner layer body 3 can easily separate from the outer layer body 2 at the vertical rib 10 in the initial separation treatment.

In the synthetic resin-made container 1 according to this embodiment, the groove depth of the vertical rib 10 is smaller in the upper end 10T and the lower end 10B, and the inner layer body 3 easily separates from the outer layer body 2 at the upper end 10T or the lower end 10B. Therefore, a process of separating the inner layer body 3 from the outer layer body 2 and a subsequent process of restoring the inner layer body 3 to the original shape after the formation of the vapor-deposited film 3a and before use can be performed smoothly, and the intended gap can be easily formed between the inner layer body 3 and the outer layer body 2 at the position of the vertical rib 10.

The vertical rib 10 in this embodiment smoothly connects to the outer surface of the shoulder portion 7 at the upper end 10T and the lower end 10B. With such a structure, the inner layer body 3 can be separated more smoothly at the position of the upper end 10T or the lower end 10B of the vertical rib 10 in the initial separation treatment.

In this embodiment, the lower end 10B of the vertical rib 10 is located above the lower end of the shoulder portion 7. For example, in the case where the vertical rib 10 extends from the shoulder portion 7 to the barrel portion 5 so that the lower end 10B is located in the barrel portion 5, there is a possibility that the inner layer body 3 is not easily separated at the lower end 10B in the initial separation treatment. By locating the lower end 10B of the vertical rib 10 in the shoulder portion 7 as in this embodiment, on the other hand, the inner layer body 3 can be easily separated after the formation of the vapor-deposited film 3a and before use. The vertical rib 10 may extend from the shoulder portion 7 to the barrel portion 5 so that the lower end 10B is located in the barrel portion 5.

As illustrated in FIG. 2, each vertical rib 10 extends in the radial direction of the synthetic resin-made container 1 in a planar view of the synthetic resin-made container 1. Moreover, each vertical rib 10 extends approximately linearly from the upper end 10T to the lower end 10B. However, the present disclosure is not limited to such, and each vertical rib 10 may be bent or curved.

As illustrated in FIGS. 1A and 2, the width (the groove width of the part open to the outer surface of the shoulder portion 7 in a direction perpendicular to the extending direction) of each vertical rib 10 is smaller in the upper end 10T and the lower end 10B, i.e. each vertical rib 10 tapers down toward the upper end 10T and the lower end 10B. With such a structure, the separability of the inner layer body 3 at the vertical rib 10 after the formation of the vapor-deposited film 3a and before use can be further enhanced.

Each vertical rib 10 may be a convex rib projecting from the surface of the shoulder portion 7 toward the outside of the container. In such a case, the projection height of the vertical rib 10 is preferably smaller at least in the upper end 10T or the lower end 10B than in the central part 10M. In this case, the cross-sectional shape of the vertical rib 10 is a convex shape in the inner layer body 3 corresponding to the convex shape in the outer layer body 2.

Annular barrel lower rib 5a are each uniformly formed in the circumferential direction in a lower part of the barrel portion 5 of the synthetic resin-made container 1, as illustrated in FIG. 1A. Two barrel lower ribs 5a are arranged in the vertical direction, each as a concave rib depressed toward the inside of the container. In the part where the barrel lower rib 5a is formed, the shape of the inner layer body 3 is a concave rib shape corresponding to the shape of the outer layer body 2.

As a result of the lower part of the barrel portion 5 having the barrel lower rib 5a, when forming the vapor-deposited film 3a on the inner surface of the inner layer body 3 in the manufacturing process of the synthetic resin-made container 1, the inner layer body 3 can be prevented from peeling away from the outer layer body 2 by the irregularities of the part of the barrel lower rib 5a even when the inside of the inner layer body 3 is vacuumed.

Although two barrel lower ribs 5a are arranged in the vertical direction in this embodiment, the present disclosure is not limited to such. Any number of barrel lower ribs 5a may be provided. Each barrel lower rib 5a need not necessarily have a uniform shape in the circumferential direction, and may have a concavo-convex shape in the circumferential direction, too.

Figure 3:
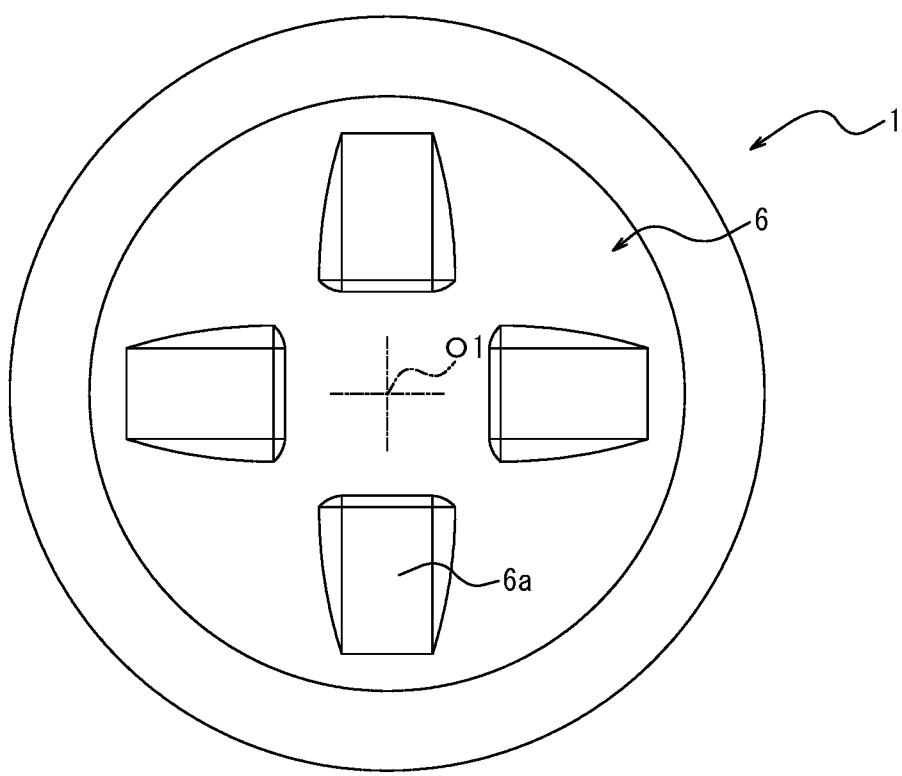
FIG. 3 is a bottom view of the synthetic resin-made container according to one of the disclosed embodiments.

Four bottom ribs 6a are formed at intervals of approximately 90 degrees in the circumferential direction around the central axis O1 in the bottom portion 6 of the synthetic resin-made container 1, as illustrated in FIG. 3. The bottom ribs 6a are each formed as concave rib extending in the radial direction and depressed toward the inside of the container in the bottom portion 6 of the synthetic resin-made container 1. In the part where the bottom rib 6a is formed, the shape of the inner layer body 3 is a concave rib shape corresponding to the shape of the outer layer body 2.

As a result of the bottom portion 6 having the bottom rib 6a, when forming the vapor-deposited film 3a on the inner surface of the inner layer body 3 in the manufacturing process of the synthetic resin-made container 1, the inner layer body 3 can be prevented from peeling away from the outer layer body 2 by the irregularities of the part of the bottom rib 6a even when the inside of the inner layer body 3 is vacuumed.

Although four bottom ribs 6a are arranged at intervals of approximately 90 degrees in the circumferential direction in this embodiment, the present disclosure is not limited to such. Any number of bottom ribs 6a may be provided. Each bottom rib 6a need not necessarily extend in the radial direction, and may extend in the circumferential direction.

In the example illustrated in FIGS. 1A and 3, each barrel lower rib 5a formed in the lower part of the barrel portion 5 is depressed radially inward, whereas each bottom rib 6a formed in the bottom portion 6 is depressed upward. That is, the barrel lower rib 5a and the bottom rib 6a are depressed in directions orthogonal to each other. In the case where the synthetic resin-made container 1 has both the barrel lower rib 5a and the bottom rib 6a, even when the inner layer body 3 tries to move in a direction in which the inner layer body 3 peels away from the outer layer body 2 at one of the barrel lower rib 5a and the bottom rib 6a, the other one of the barrel lower rib 5a and the bottom rib 6a blocks the movement. For example, if the inner layer body 3 tries to peel away from the outer layer body 2 and move radially inward in the lower part of the barrel portion 5, the bottom rib 6a in the bottom portion 6 functions to block the movement. If the inner layer body 3 tries to peel away from the outer layer body 2 and move upward in the bottom portion 6, the barrel lower rib 5a in the lower part of the barrel portion 5 functions to block the movement. Thus, even when the inside of the inner layer body 3 is vacuumed when forming the vapor-deposited film 3a, the inner layer body 3 can be effectively prevented from peeling away from the outer layer body 2 by the synergistic effect of the barrel lower rib 5a and the bottom rib 6a.

Although no rib is formed in the barrel portion 5 other than the lower part in this embodiment, a rib may be formed in a region other than the lower part of the barrel portion 5 to further prevent the inner layer body 3 from peeling away from the outer layer body 2 when forming the vapor-deposited film 3a.

Figure 4:
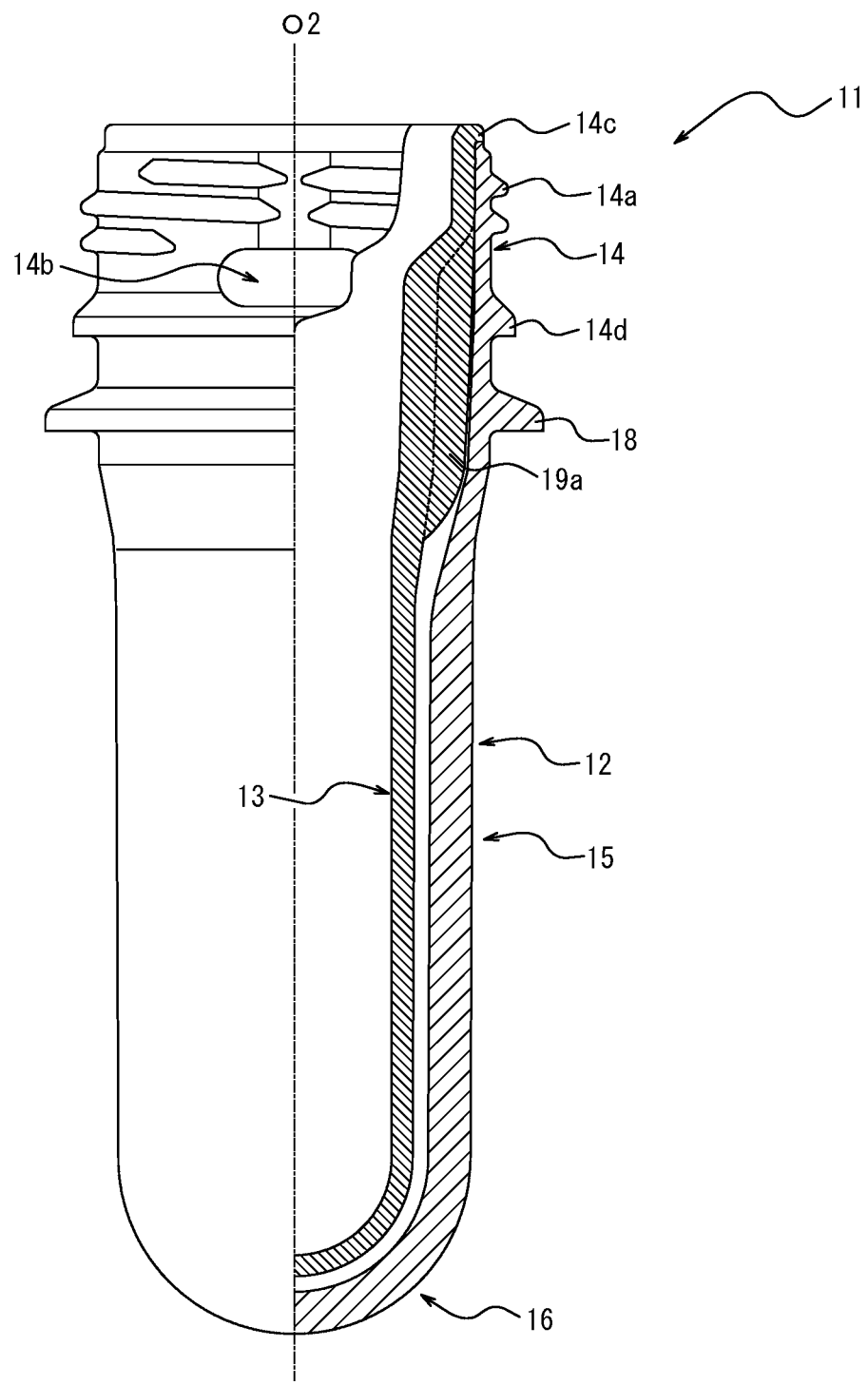
FIG. 4 is a partial front sectional view of a preform according to one of the disclosed embodiments.

The synthetic resin-made container 1 can be formed by stretch blow molding the synthetic resin-made preform 11 illustrated in FIG. 4.

The preform 11 has a double structure including a synthetic resin-made outer body 12 for forming the outer layer body 2 and a synthetic resin-made inner body 13 for forming the inner layer body 3. The outer shape of the preform 11 is a bottomed tubular shape (approximately test tube shape) including a cylindrical mouth portion 14, a cylindrical barrel portion 15 connected to and located below the mouth portion 14, and a bottom portion 16 closing the lower end of the barrel portion 15. The mouth portion 14 is formed in a shape corresponding to the mouth portion 4 of the synthetic resin-made container 1, and has a male screw 14a and an outside air introduction port 14b formed through the outer body 12. The bottom portion 16 is formed in a curved shape (semispherical shape). An open part at the upper end of the inner body 13 is provided with an annular flange 14c projecting radially outward. As a result of the flange 14c being laid over (placed on) the open end of the outer body 12, the open part of the inner body 13 is fixed to the open end. Reference sign O2 is a central axis common to the mouth portion 14, the barrel portion 15, and the bottom portion 16.

The outer body 12 may be made of the same synthetic resin material as the outer layer body 2, i.e. a synthetic resin material that is stretch blow moldable, such as polyethylene terephthalate (PET), polypropylene (PP), or polyethylene (PE). The inner body 13 may be made of the same synthetic resin material as the inner layer body 3, i.e. polyethylene terephthalate (PET), nylon, or the like. The inner body 13 is thinner than the outer body 12, and is laminated on the inner surface of the outer body 12 so as to cover the whole inner surface.

Air passage ribs 19a are formed in the outer surface of the inner body 13, as illustrated in FIG. 4. In this embodiment, the air passage ribs 19a project radially outward from the outer circumferential surface in the mouth portion 14. Three air passage ribs 19a on the left of the outside air introduction port 14b and three air passage ribs 19a on the right of the outside air introduction port 14b in FIG. 4 are arranged symmetrically with respect to the outside air introduction port 14b. Each air passage rib 19a extends in the vertical direction from above the outside air introduction port 14b in the mouth portion 14 of the preform 11 downward over the neck ring 18, as illustrated in FIG. 4. By forming the air passage ribs 19a in this way, not only an air passage can be secured by improvement in the rigidity of the inner body 13 but also a wider air passage can be secured through the space between the air passage ribs 19a. Consequently, in the synthetic resin-made container 1 obtained by stretch blow molding the preform 11, outside air introduced from the outside air introduction port 4b can be smoothly supplied to the barrel portion 5. In this embodiment, the air passage ribs 19a extend upward to the height of the outside air introduction port 14b, so that outside air introduced from the outside air introduction port 14b can be more smoothly supplied to the barrel portion 5 through the air passage ribs 19a.

In this embodiment, three air passage ribs 19a on the left and three air passage ribs 19a on the right are arranged symmetrically with respect to the outside air introduction port 14b. However, the present disclosure is not limited to such, as long as at least one air passage rib 19a is provided. The number of air passage ribs 19a and the spacing between the air passage ribs 19a can be freely determined.

A method of manufacturing the synthetic resin-made container 1 according to one of the disclosed embodiments will be described below.

Figure 5:
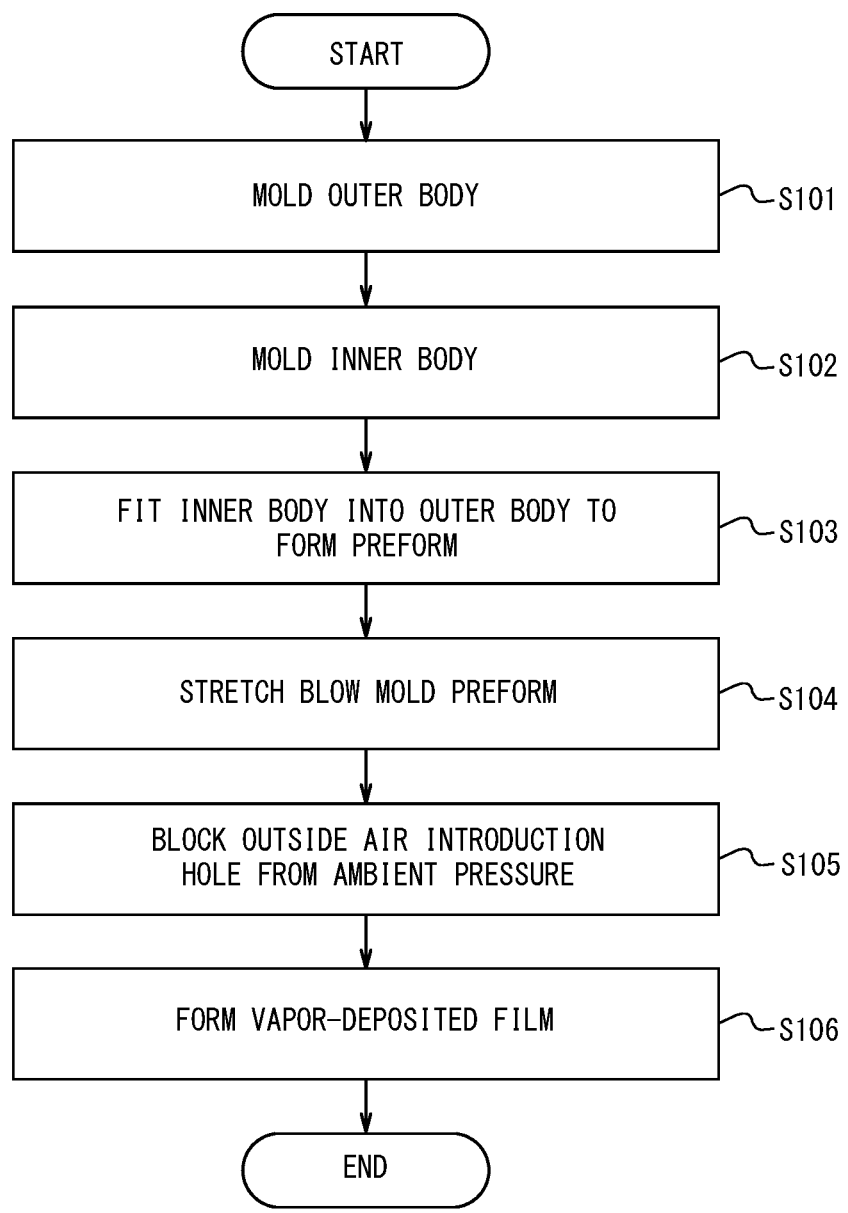
FIG. 5 is a flowchart illustrating a procedure of a method of manufacturing a synthetic resin-made container according to one of the disclosed embodiments.

FIG. 5 is a flowchart illustrating a procedure of performing the method of manufacturing the synthetic resin-made container 1 according to this embodiment.

A method of forming the preform 11 for manufacturing the synthetic resin-made container 1 by stretch blow molding will be described first. First, the outer body 12 illustrated in FIG. 4 is molded by injection molding (step S101). Along with the molding of the outer body 12, the inner body 13 illustrated in FIG. 4 is molded by another injection molding process (step S102). Although the molding of the outer body 12 is followed by the molding of the inner body 13 in FIG. 5, the molding order is not limited, as the outer body 12 and the inner body 13 can be molded independently of each other. The molding of the outer body 12 and the inner body 13 is not limited to injection molding, and other molding methods such as compression molding may be used.

Next, the outer circumferential surface of the inner body 13 formed in step S102 is fitted onto the inner circumferential surface of the outer body 12, to form the preform 11 (step S103). In the formation of the preform 11, the inner body 13 is positioned relative to the outer body 12 in the vertical direction, as a result of the annular flange 14c which projects radially outward from the upper end of the mouth portion 14 of the inner body 13 abutting the open end of the outer body 12 from above, as illustrated in FIG. 4. Moreover, for example, the inner body 13 and the outer body 12 may be positioned relative to each other in the circumferential direction by fitting a protrusion formed on the outer circumferential surface of the inner body 13 into a depression formed on the inner circumferential surface of the outer body 12.

Next, the preform 11 formed in step S103 is stretch blow molded to form the outer shape of the synthetic resin-made container 1 which is a delamination container (step S104). In the stretch blow molding, first, the preform 11 is heated in a heating furnace. Following this, from the heating state of the preform 11, the neck ring 18 of the preform 11 is caused to abut a reference plane of a mold for blow molding to be fixed to the mold, and the preform 11 is stretch blow molded. Consequently, the outer body 12 and the inner body 13 are blow molded radially outward by high pressure air, while being stretched downward by a stretching rod. Here, since an unstretched part below the neck ring 18 in the mouth portion 14 of the preform 11 does not stretch downward, the inner body 13 tends to expand radially outward due to the pressure of high pressure air blown into the preform 11. In this embodiment, however, the air passage rib 19a is formed to extend below the neck ring 18 which is the unstretched part of the mouth portion 14, so that the rigidity in the region is enhanced and the region can be prevented from expanding radially outward due to high pressure air. Hence, an air passage for outside air from the outside air introduction port 14b to the barrel portion 15 can be easily secured.

Although the mouth portion 4 and the barrel portion 5 have an approximately cylindrical shape in the synthetic resin-made container 1 in this embodiment, the present disclosure is not limited to such. For example, the mouth portion 4 and the barrel portion 5 may have a rectangular tubular shape or an elliptic tubular shape. Likewise, although the mouth portion 14 and the barrel portion 15 in the preform 11 have an approximately cylindrical shape in this embodiment, the present disclosure is not limited to such, and the mouth portion 14 and the barrel portion 15 may have, for example, a rectangular tubular shape or an elliptic tubular shape.

Figure 6:
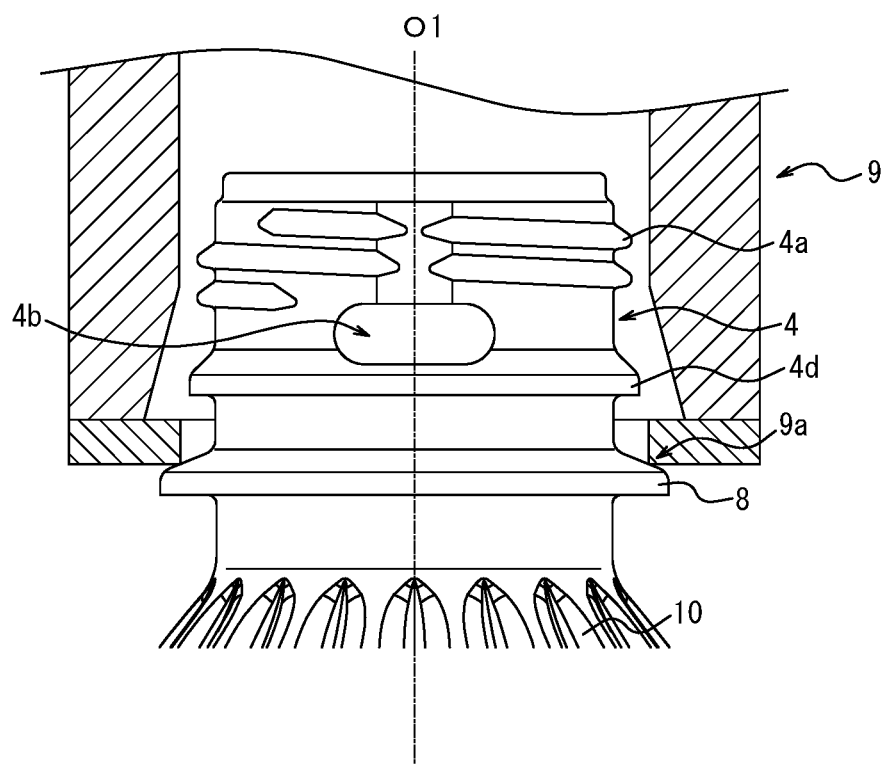
FIG. 6 is a view illustrating a state in which an outside air introduction port in the synthetic resin-made container according to one of the disclosed embodiments is blocked from pressure of outside air.

Next, in the synthetic resin-made container 1 having the outer shape formed in step S104, the outside air introduction port 4b is blocked from the ambient pressure outside the outer layer body 2 (step S105). In this embodiment, step S105 is performed by covering the mouth portion 4 of the synthetic resin-made container 1 with a tubular seal member 9 illustrated in FIG. 6 from above and causing an abutting portion 9a located at the lower end of the seal member 9 to abut the upper surface of the neck ring 8 of the synthetic resin-made container 1. Tables 1 and 2 below respectively show the vapor deposition conditions of silica and DLC in the case where polyethylene terephthalate (PET) is used in the outer layer body 2 and the inner layer body 3. The bottle capacity of the synthetic resin-made container 1 subjected to the formation of the vapor-deposited film 3a under each vapor deposition condition is approximately 450 ml. For example, in the case of using silica in the vapor-deposited film 3a, vacuuming is performed while providing a pressure difference so that the pressure (9.0 [Pa] during vapor deposition of an adhesion layer, 25.0 [Pa] during vapor deposition of a barrier layer) inside the synthetic resin-made container 1 (inside the inner layer body 3) will be lower than the pressure (30.0 [hPa] for both the adhesion layer and the barrier layer) outside (outside the outer layer body 2) as shown in Table 1. That is, the inside of the seal member 9 is maintained at the pressure (9.0 [Pa] during vapor deposition of the adhesion layer, 25.0 [Pa] during vapor deposition of the barrier layer) inside the inner layer body 3, and the outside of the seal member 9 is maintained at the pressure (30.0 [hPa] for both the adhesion layer and the barrier layer) outside the outer layer body 2. Here, if the outside air introduction port 4b is exposed to the ambient pressure outside the outer layer body 2, the pressure in the space between the outer layer body 2 and the inner layer body 3 is equal to the ambient pressure. In such a case, the inner layer body 3 is pressed radially inward, as a result of which the inner layer body 3 tends to peel away from the outer layer body 2, which makes vapor deposition difficult. In this embodiment, the vapor-deposited film 3a is formed while the seal member 9 blocks the outside air introduction port 4b from the ambient pressure outside the outer layer body 2 as illustrated in FIG. 6 (step S106), so that the pressure inside the inner layer body 3 and the pressure outside the inner layer body 3 can be maintained approximately equal to each other. Thus, the inner layer body 3 can be prevented from being pressed radially inward, and therefore can be prevented from peeling away from the outer layer body 2 when forming the vapor-deposited film 3a. In the case of using DLC in the vapor-deposited film 3a, no pressure difference between inside and outside the synthetic resin-made container 1 is provided (9.0 [Pa] both inside and outside) as shown in Table 2. Hence, step S106 is performed without blocking the ambient pressure in step S105.

TABLE 1

| Vapor-deposited film | Film formation stage | Microwave output setting (2.45 GHz) | | | | Gas flow rate [sccm] | | |
|---|---|---|---|---|---|---|---|---|
| | | Power [W] | Pulse [msec.] ON | Pulse [msec.] OFF | Film formation time [sec.] | HMDSO | HMDSN | $O_2$ |
| None | — | — | — | — | — | — | — | — |
| Silica | Adhesion layer | 500 | 1.2 | 25 | 1.2 | 11.1 | — | 35.0 |
| | Barrier layer | 1500 | 8.0 | 44 | 3.5 | — | 3.2 | 300.0 |

| Vapor-deposited film | Film formation stage | Pressure inside and outside of container | | Oxygen transmission amount Outside: 23° C.-55% RH Inside: 23° C.-90% RH | |
|---|---|---|---|---|---|
| | | Inside [Pa] | Outside [hPa] | [cc/day per container] | BIF |
| None | — | — | — | 0.0760 | — |
| Silica | Adhesion layer | 9.0 | 30.0 | 0.0070 | 10.9 |
| | Barrier layer | 25.0 | 30.0 | | |

TABLE 2

| Vapor-deposited film | High frequency output setting (13.56 MHz) | | Gas flow rate ($C_2H_2$) [sccm] | Pressure inside electrode [Pa] | Oxygen transmission amount Outside: 23° C.-55% RH Inside: 23° C.-90% RH | |
|---|---|---|---|---|---|---|
| | Power [W] | Film formation time [sec.] | | | [cc/day per container] | BIF |
| None | — | — | — | — | 0.0760 | — |
| DLC | 500 | 1.3 | 60.0 | 9.0 | 0.0045 | 16.9 |

The rightmost fields in Tables 1 and 2 indicate the oxygen transmission amount of the inner layer body 3 in the case of using silica in the vapor-deposited film 3a and in the case of using DLC in the vapor-deposited film 3a, respectively. As shown in Table 1, in the case of forming the inner layer body 3 using polyethylene terephthalate (PET) alone without the vapor-deposited film 3a, the oxygen transmission amount per day per one container was 0.0760 [cc]. In the case of forming the vapor-deposited film 3a of the inner layer body 3 using silica, the oxygen transmission amount per day per one container was 0.0070 [cc], and the BIF (barrier improvement factor) indicating its ratio to the oxygen transmission amount in the case of using PET alone in the inner layer body 3 was good, i.e. 10.9. As shown in Table 2, in the case of forming the vapor-deposited film 3a of the inner layer body 3 using DLC, the oxygen transmission amount per day per one container was 0.0045 [cc], and the BIF was better, i.e. 16.9.

As described above, a synthetic resin-made container 1 according to this embodiment is a synthetic resin-made container 1 that has an outer layer body 2 and an inner layer body 3 separably laminated on an inner surface of the outer layer body 2 and is formed by stretch blow molding, the synthetic resin-made container 1 comprising: a tubular mouth portion 4; a barrel portion 5 connected to and located below the mouth portion 4; and a bottom portion 6 closing a lower end of the barrel portion 5, wherein the outer layer body 2 contains polyethylene terephthalate (PET), the inner layer body 3 is made of polyethylene terephthalate, a laminate containing polyethylene terephthalate, or a blend containing polyethylene terephthalate, and has a vapor-deposited film 3a having a gas barrier property on an inner surface thereof, and a rib (barrel lower rib 5a, bottom rib 6a) that prevents the inner layer body 3 from peeling away from the outer layer body 2 when forming the vapor-deposited film 3a is formed in at least one of a lower part of the barrel portion 5 and the bottom portion 6. With such a structure, even in the case where the inside of the inner layer body 3 is vacuumed when forming the vapor-deposited film 3a on the inner surface of the inner layer body 3 in the manufacturing process of the synthetic resin-made container 1 in order to enhance the gas barrier property of the inner layer body 3, the inner layer body 3 can be prevented from peeling away from the outer layer body 2 by the ribs provided in the lower part of the barrel portion 5 and the bottom portion 6. The vapor-deposited film 3a can therefore be formed favorably.

In the synthetic resin-made container 1 according to this embodiment, the rib formed in the lower part of the barrel portion 5 is an annular concave rib extending in a circumferential direction. With such a structure, the inner layer body 3 can be effectively prevented from peeling away from the outer layer body 2 and moving in the vertical direction in particular.

In the synthetic resin-made container 1 according to this embodiment, the rib formed in the bottom portion 6 is concave ribs arranged approximately at equal intervals in a circumferential direction. With such a structure, the inner layer body 3 can be effectively prevented from peeling away from the outer layer body 2 and moving in the radial direction in particular.

A method of manufacturing a synthetic resin-made container 1 according to this embodiment is a method of manufacturing a synthetic resin-made container 1 that has an outer layer body 2 and an inner layer body 3 laminated on an inner surface of the outer layer body 2, the synthetic resin-made container 1 including: a tubular mouth portion 4 having an outside air introduction port 4b formed through the outer layer body 2; a barrel portion 5 located below the mouth portion 4; and a bottom portion 6 closing a lower end of the barrel portion 5, the method comprising: forming a preform 11; stretch blow molding the preform 11 to form an outer shape of the synthetic resin-made container 1; blocking the outside air introduction port 4b from an ambient pressure outside the outer layer body 2; and forming a vapor-deposited film 3a having a gas barrier property, on an inner surface of the inner layer body 3. With such a structure, particularly in the case of forming the vapor-deposited film 3a while vacuuming the inside of the inner layer body 3 to be lower in pressure than the outside of the outer layer body 2 (see the case of using silica in the vapor-deposited film 3a in Table 1), the space between the outer layer body 2 and the inner layer body 3 can be kept from being subjected to the pressure of the outside of the outer layer body 2. Thus, the inside and outside of the inner layer body 3 are maintained at approximately the same pressure, with it being possible to prevent the inner layer body 3 from being pressed radially inward. Since the inner layer body 3 can be prevented from peeling away from the outer layer body 2 when forming the vapor-deposited film 3a, the vapor-deposited film 3a can be formed favorably.

In the method of manufacturing the synthetic resin-made container 1 according to this embodiment, an annular protrusion projecting radially outward is located below the outside air introduction port 4b, and the blocking includes causing an abutting portion 9a of a tubular seal member 9 to abut the annular protrusion from above. With such a structure, by a simple method of covering the mouth portion 4 with the tubular seal member 9 from above, the outside air introduction port 4b can be blocked from the ambient pressure outside the outer layer body 2, and the vapor-deposited film 3a can be formed favorably.

In the method of manufacturing the synthetic resin-made container 1 according to this embodiment, the annular protrusion is a neck ring 8 for attaching the preform 11 to a mold for blow molding. With such a structure, the outside air introduction port 4b can be blocked from the ambient pressure outside the outer layer body 2 and the vapor-deposited film 3a can be formed favorably, with no need to provide a special structure in the synthetic resin-made container 1

Although the disclosed technique has been described by way of the drawings and embodiments, various changes or modifications may be easily made by those of ordinary skill in the art based on the present disclosure. Such various changes or modifications are therefore included in the scope of the present disclosure. For example, the functions included in the components, etc. may be rearranged without logical inconsistency, and a plurality of components, etc. may be combined into one component, etc. and a component, etc. may be divided into a plurality of components, etc. These are also included in the scope of the present disclosure.

For example, although the vertical rib 10 is provided in the shoulder portion 7 of the synthetic resin-made container 1 in this embodiment, the present disclosure is not limited to such, and the vertical rib 10 may be omitted.

Although the air passage rib 19a is provided in the mouth portion 14 of the preform 11 in this embodiment, the present disclosure is not limited to such, and the air passage rib 19a may be omitted.

REFERENCE SIGNS LIST 1 synthetic resin-made container
2 outer layer body
3 inner layer body
3a vapor-deposited film
4 mouth portion
4a male screw
4b outside air introduction port
4d bead
5 barrel portion
5a barrel lower rib (rib formed in lower part of barrel portion)
6 bottom portion
6a bottom rib (rib formed in bottom portion)
7 shoulder portion
8 neck ring (annular protrusion)
9 seal member
9a abutting portion
10 vertical rib
10B lower end
10M central part
10T upper end
11 preform
12 outer body
13 inner body
14 mouth portion
14a male screw
14b outside air introduction port
14c flange
14d bead
15 barrel portion
16 bottom portion
18 neck ring
19a air passage rib
O1, O2 central axis
S containing portion

The invention claimed is:

1. A synthetic resin-made container that has an outer layer body and an inner layer body separably laminated on an inner surface of the outer layer body and is formed by stretch blow molding, the synthetic resin-made container comprising:
a tubular mouth portion;
a barrel portion connected to and located below the mouth portion; and
a bottom portion closing a lower end of the barrel portion,
wherein the outer layer body contains polyethylene terephthalate,
the inner layer body is made of polyethylene terephthalate, a laminate containing polyethylene terephthalate, or a blend containing polyethylene terephthalate, and has a vapor-deposited film having a gas barrier property on an inner surface thereof,
a rib that prevents the inner layer body from peeling away from the outer layer body when forming the vapor-deposited film is formed in at least the bottom portion, and in a part where the rib is formed, the shape of the inner layer body is a rib shape corresponding to the shape of the outer layer body, and wherein the depth of the rib in the vertical direction decreases gradually toward the outer side in the radial direction.

2. The synthetic resin-made container according to claim 1, wherein a rib formed in a lower part of the barrel portion is an annular concave rib extending in a circumferential direction.

3. The synthetic resin-made container according to claim 1, wherein the rib formed in the bottom portion comprises a plurality of concave ribs arranged approximately at equal intervals in a circumferential direction.

* * * * *